United States Patent [19]
Henley et al.

[11] Patent Number: 5,342,066
[45] Date of Patent: Aug. 30, 1994

[54] NON-EXTRUSION DEVICE FOR SPLIT ANNULAR CASING/TUBING HANGER COMPRESSION SEALS

[75] Inventors: Ronald W. Henley, Kingwood; Ronald D. Quates, Houston; Michael R. Williams, Houston; Henry Wong, Houston, all of Tex.

[73] Assignee: FMC Corporation, Chicago, Ill.

[21] Appl. No.: 965,495

[22] Filed: Oct. 26, 1992

[51] Int. Cl.$^5$ .............................................. F16J 15/12
[52] U.S. Cl. .............................. 277/116.2; 277/188 R; 277/188 A; 166/208
[58] Field of Search ............... 277/188 R, 188 A, 236, 277/116.2, 117-122; 166/196, 208, 348; 411/531, 542, 544, 915

[56] References Cited

U.S. PATENT DOCUMENTS

| | | | |
|---|---|---|---|
| 1,721,326 | 7/1929 | Wilson | 277/236 |
| 2,212,138 | 8/1940 | Wright et al. | 277/236 X |
| 3,049,370 | 8/1962 | Bertrand | 277/188 R |
| 4,127,168 | 11/1978 | Hanson et al. | 277/236 X |
| 4,324,407 | 4/1982 | Upham et al. | 277/236 X |
| 4,353,560 | 10/1982 | Tohill | 277/236 |
| 4,363,465 | 12/1982 | Morrill | 277/125 X |
| 4,384,726 | 5/1983 | Meyer | 277/188 A X |
| 4,749,043 | 6/1988 | Rodenberger | 277/236 X |
| 4,759,409 | 7/1988 | Gullion | 277/236 X |

FOREIGN PATENT DOCUMENTS

| | | | |
|---|---|---|---|
| 215362 | 10/1909 | Fed. Rep. of Germany | 277/188 R |
| 392177 | 9/1965 | Switzerland | 277/188 R |
| 2098676 | 11/1982 | United Kingdom . | |
| 2106957 | 4/1983 | United Kingdom . | |
| 2126629 | 3/1984 | United Kingdom . | |
| 2210116 | 6/1989 | United Kingdom . | |
| 2253871 | 9/1992 | United Kingdom . | |

Primary Examiner—William A. Cuchlinski, Jr.
Assistant Examiner—Scott W. Cummings
Attorney, Agent, or Firm—Lawrence Cruz; Richard B. Megley

[57] ABSTRACT

A non-extrusion device for split annular well casing and tubing hanger compression seals has a flat annular body having truncated, radially-split cone portions forming through holes for receiving pins or bolts and for guiding a compressed elastomer seal between inner and outer tubing structures along a radial direction to prevent axial extrusion of the seal.

8 Claims, 4 Drawing Sheets

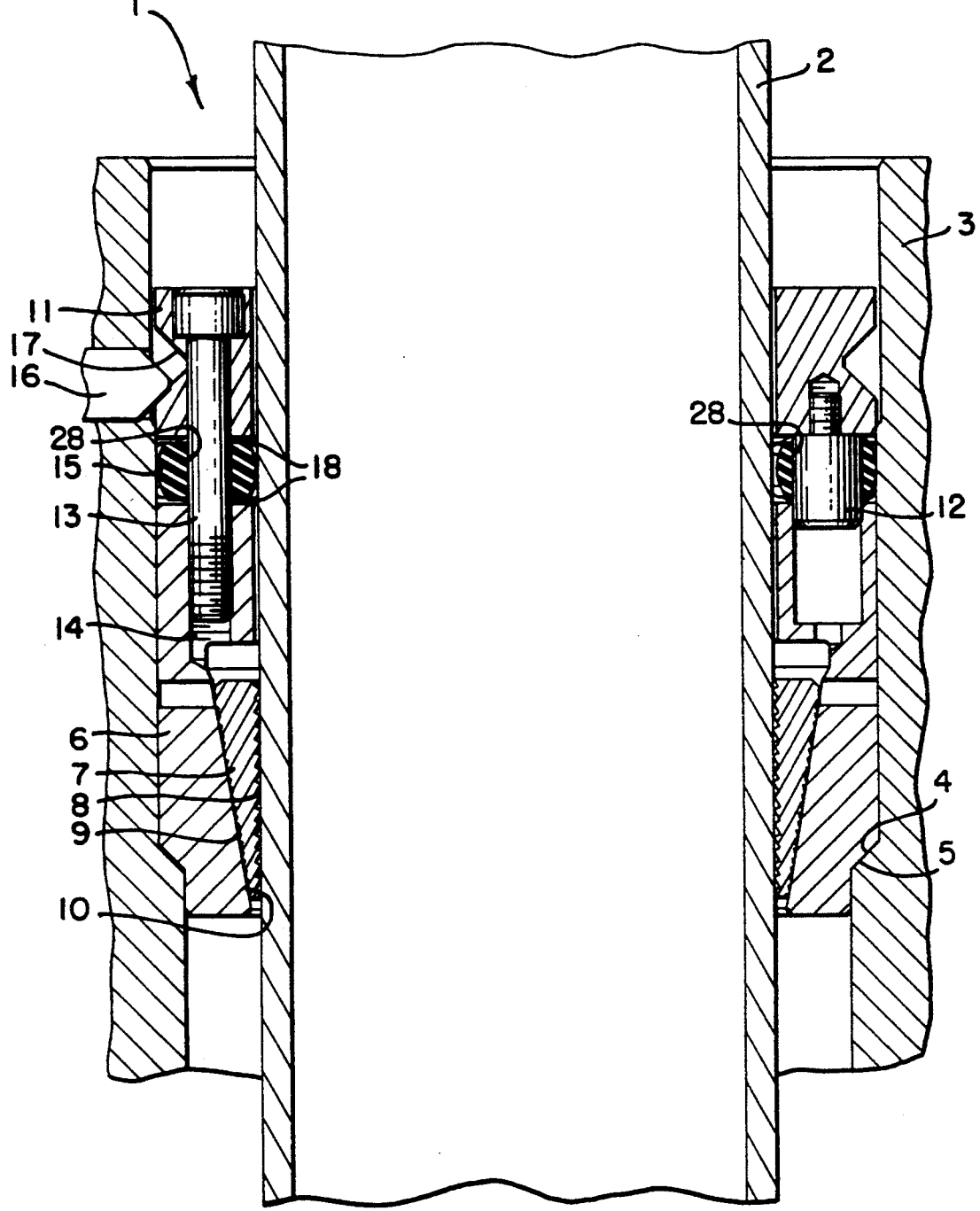

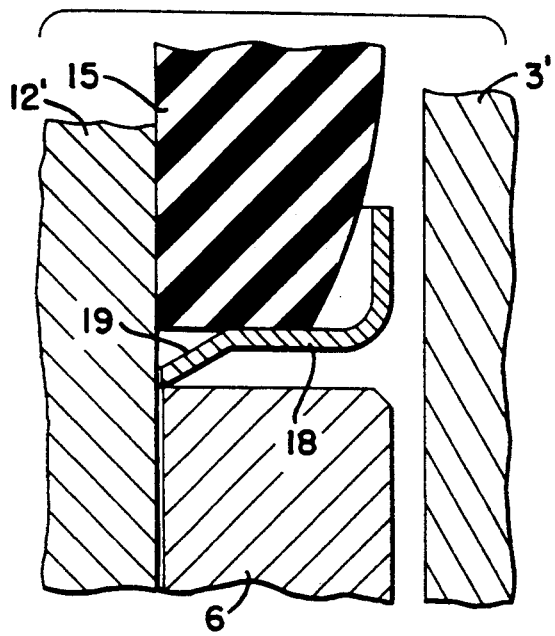
FIG_2
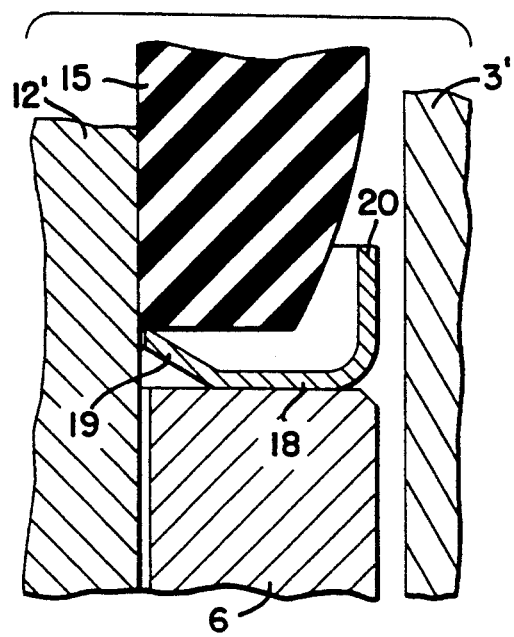
FIG_3
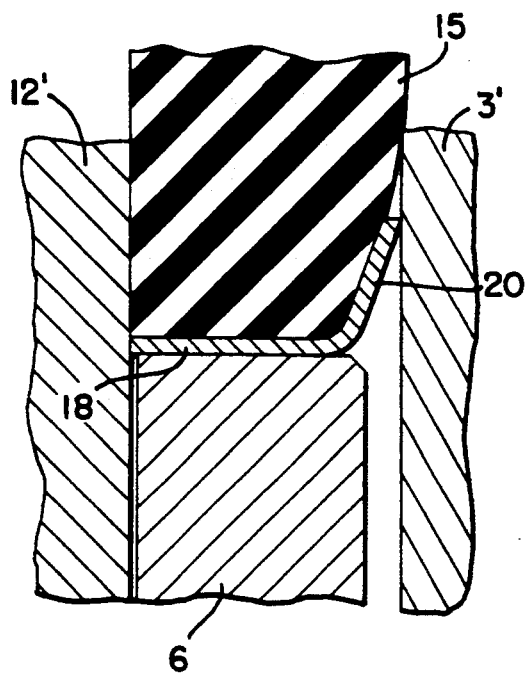
FIG_4
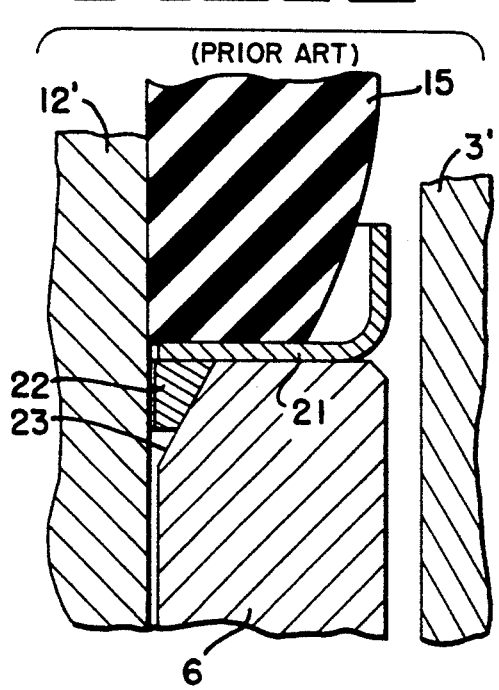
FIG_5 (PRIOR ART)

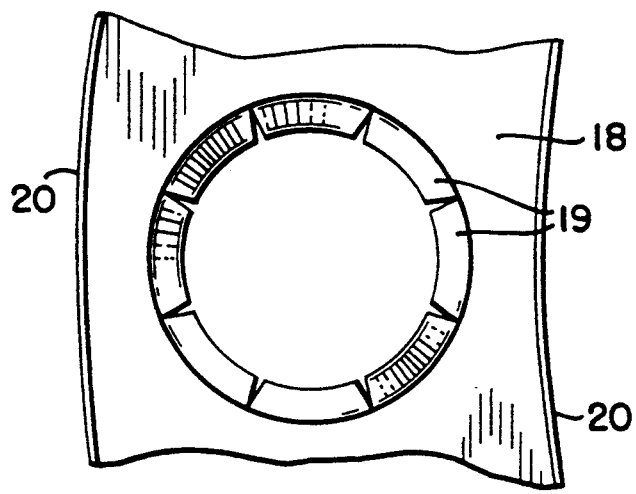
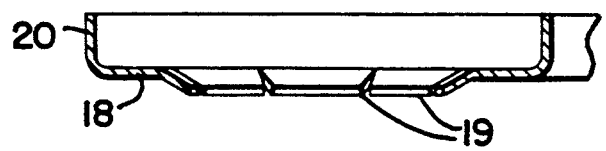
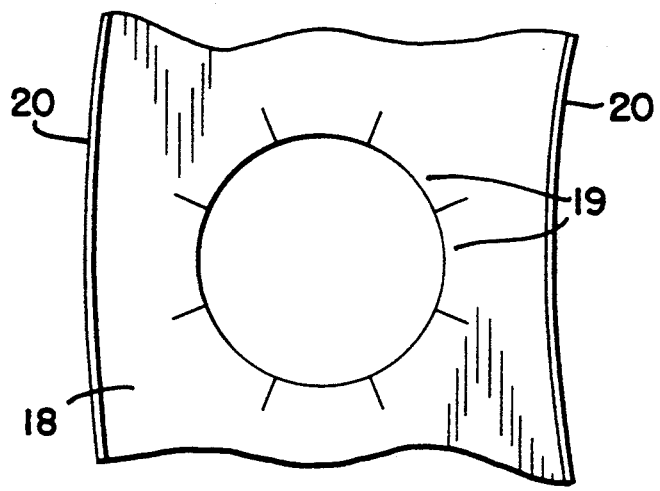
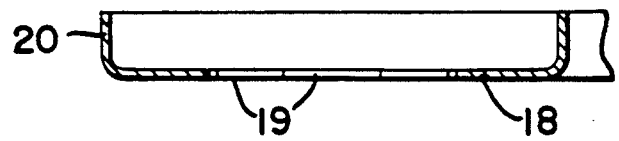

FIG_10
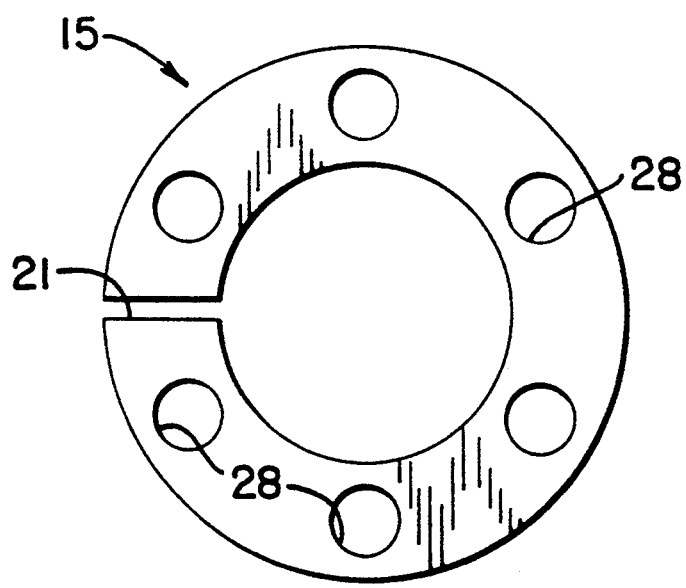
FIG_11
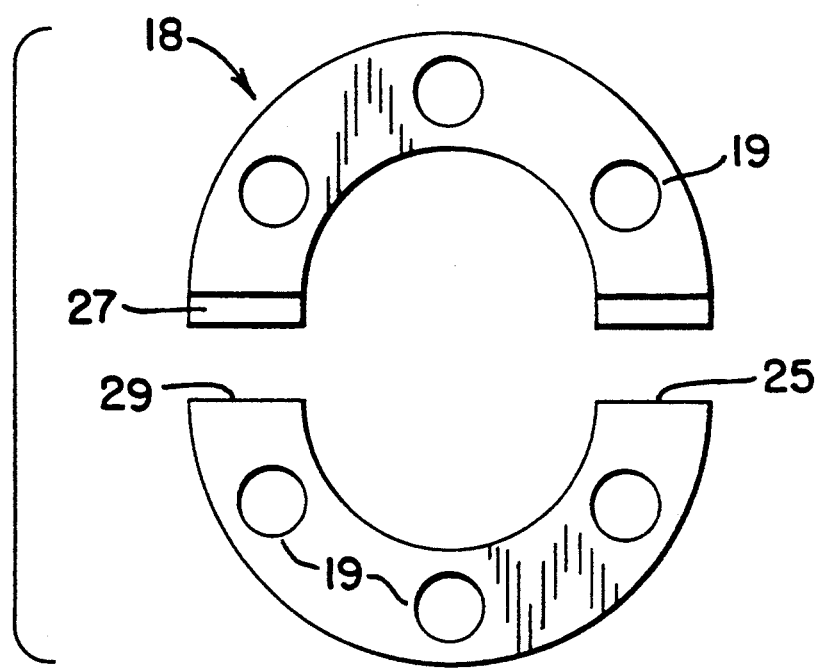

NON-EXTRUSION DEVICE FOR SPLIT ANNULAR CASING/TUBING HANGER COMPRESSION SEALS

BACKGROUND OF THE INVENTION

This invention relates to well casing support systems for suspending oilwell casings from a surface wellhead, and more particularly to split annular compression seals for use with a slip hanger forming a seal between a well casing and an inner surface of a casing head.

Prior known compression seals form a seal when an annular elastomer seal is compressed within the slip hanger structure. This type of seal is typically compressed between two or more relatively displaceable annular slip hanger components. The seal is typically formed with through holes for receiving pins or bolts that guide or draw together the slip hanger components. When the slip hanger components are displaced toward each other axially, the annular compression seal is deformed along a radial plane to engage the casing and the inner surface of the casing head.

Problems have occurred with these types of seals under broad temperature ranges because of the difficulty in controlling elastomer extrusion through the gaps that are necessary due to the manufacturing tolerances of the casing wellhead and hanger components. Furthermore, the thermal expansion and contraction of elastomer seal elements encased in the steel elements of hangers increase the difficulty in sealing due to amplification of stress in the elastomer. This results because the coefficient of thermal expansion of elastomers is about ten times greater than steel. With continuing development of the petroleum industry in increasingly severe environments, the requirements for safely controlling downhole pressures communicated to the surface of oilwells continue to become more demanding. Problems have occurred in these types of seals when the seals are extruded so that the diameters of through holes for receiving pins or bolts have a greater diameter than that of the pins or bolts, causing gaps in the seal. Similarly, gaps occur at inner and outer contact surfaces and at splits in between components adjacent the seal element.

Prior attempts to solve this problem included molding fabric or cord into the elastomer seal. This method has proven to have very limited capability at higher elastomer pressures. Another prior attempt to solve this problem, illustrated in FIG. 5, has included the use of low modulus material and split extrusion washers 22 placed in a conical countersink 23 beneath a non-extrusion plate 21 adjacent the pins or bolts 12' as shown in FIG. 5. This method creates the need for many additional parts, especially if many load bolts or pins are required to pass through the seal element. Such a solution adds to cost and increased probability of assembly errors.

SUMMARY OF THE INVENTION

The present invention provides a solution to the above-mentioned problems through the use of a non-extrusion device to be used with an annular compression seal in a slip hanger. The device provides means for supporting and guiding the annular seal during and after compression and for providing continuous, gap-free sealing contact at the outer sealing surface, at the inner sealing surface, at through holes for pins or bolts, and at splits in between components adjacent the seal element.

The device includes a flat metal plate positioned in contact with each radial face of the annular seal element. Each plate has a lip portion that extends along a portion of the circumferential surface of the seal element and includes a truncated, open cone formed in the center. When the slip hanger elements are displaced relatively toward each other causing the seal to compress, the truncated cone portions and outer lip portions deform and engage surrounding surfaces in sealing contact.

BRIEF DESCRIPTION OF THE DRAWINGS

FIG. 1 is a sectional view through one form of the invention showing a casing suspended by a slip type hanger.

FIG. 2 is an enlarged fragmentary view of FIG. 1 showing a non-extrusion ring having a conical portion positioned under a seal element shown before energization.

FIG. 3 is an enlarged fragmentary sectional view of a second embodiment of the invention showing a non-extrusion ring having an inverted conical portion before energization.

FIG. 4 is an enlarged fragmentary sectional view of the present invention showing a non-extrusion ring and seal element after energization.

FIG. 5 is an enlarged fragmentary sectional view of a prior art device.

FIG. 6 and FIG. 7 are fragmentary top and sectional views of a non-extrusion ring having a truncated cone portion shown before energization FIG. 8 and FIG. 9 are fragmentary top and sectional views of the non-extrusion ring of FIGS. 6 and 7 shown after energization.

FIG. 10 is a top view of an annular elastomer seal element having holes and a radial split.

FIG. 11 is a top view of an annular non-extrusion ring having through holes and two radial splits.

DESCRIPTION OF THE PREFERRED EMBODIMENTS

As shown in FIG. 1, a slip type casing hanger support assembly 1 supports a casing 2. The support assembly shown is a wrap around hanger assembly that can be installed around a continuous length of casing. Therefore, the hanger assembly is axially split or hinged at positions 180 degrees apart.

The casing 2 is suspended inside a casing head 3. The casing head 3 has an interior annular shoulder 4 for supporting the casing 2 and assembly 1. An annular landing surface 5 of a slip bowl 6 engages the annular shoulder 4 and transmits the weight of the casing 2 and assembly 1 to the casing head 3. The casing 2 is gripped by a plurality of hanger slips 7. Each hanger slip 7 has upward-facing teeth 8 on the inner side for gripping and suspending the casing 2. Each hanger slip 7 has a slanted wedge surface 9 on the outer side for engaging an inner slanted surface 10 of the slip bowl 6.

When the hanger support assembly 1 is installed, the teeth 8 of each hanger slip 7 engage the casing 2. The weight of casing 2 causes the casing 2 and the hanger slips 7 to move axially downward relative to slip bowl 6. As the hanger slips 7 move downward, slanted surface 10 of the slip bowl 6 causes the hanger slips 7 to move radially inward, increasing the gripping force around the circumference of the casing 2.

The slip bowl 6 is axially aligned under a junk ring 11. Both the slip bowl 6 and the junk ring 11 are radially split at positions 180 degrees apart so that the entire assembly can be wrapped around a continuous length of casing. At diametrically opposite positions on the junk ring 11 and the slip bowl 6 are a pressure pin 12 and a bolt 13. The bolt 13 is positioned through junk ring 11 and received in a threaded bore 14 of the slip bowl 6. The pressure pin 12 is received in both the junk ring 11 and the slip bowl 6. Junk ring 11 and slip bowl 6 are drawn and held together by bolt 13 and pressure pin 12.

Positioned between the junk ring 11 and the slip bowl 6 is an annular elastomer seal element 15. The seal element 15 has at least one radial split (21) so that it can be installed around a continuous length of casing. Junk ring 11 and slip bowl 6 are displaced relatively toward each other and held in place by bolt 13 and a locking pin 16 received in a groove 17 around the outer circumferential surface of junk ring 11. Seal element 15 is compressed as junk ring 11 and slip bowl 6 are displaced relatively toward each other. Under compression, or energization, the seal element 15 expands radially both inward and outward so as to engage the inner surface of the casing head 3 and casing 2 and form a seal. Seal element 15 is formed with through holes (22) for positioning pressure pin 12 and bolt 13 through the seal element 15.

Non-extrusion devices 18 in the form of generally flat rings of similar diameter to the seal element 15 are positioned against both radial faces of seal element 15. Since this is a wrap-around hanger assembly for being installed around a continuous length of casing, the non-extrusion rings 18 are axially split in two diametrically opposed locations (23,25). At least one of the radially split portions of each non-extrusion ring 18 has a formed extension (27) that slides into the other portion in mating relationship to form one annular ring.

As shown in FIG. 2, each non-extrusion device 18 has open, truncated conical portions 19 located in alignment with through holes (22) of the seal element 15. The conical portion 19 is designed to be flexible so that it will collapse around a bolt or pin member 12 inserted through it. Each non-extrusion device 18 also has a side wall 20 located at the inner circumference and the outer circumference, as shown clearly in FIGS. 6–9. Before compression of the seal element 15, the non-extrusion ring 18 does not contact the bolt or pin member 12' inserted through its center, as shown in FIG. 2.

As the junk ring 11 and slip bowl 6 are moved toward each other, each engages the non-extrusion device 18 positioned between it and the seal element 15. As this occurs, each conical portion 19 begins to flatten against either the slip bowl 6 or the junk ring 11 until the conical portion 19 lies in a common plane with the flat radial portion of the non-extrusion ring 18. As the junk ring 11 and slip bowl 6 continue to move closer together, the seal element 15, under compression, deforms radially outward and inward to engage the side walls 20.

Upon full compression, as illustrated in FIG. 4, the side walls 20 are biased outwardly by the radially expanded seal element 15 so that the side walls 20 engage the adjacent casing or casing head 3' to form a seal. In this fully compressed position, the conical portion 19 has deformed so that the diameter of the opening at its center has shrunk into sealing engagement with the bolt or pin member 12'.

To facilitate deformation and shrinking of diameter, the conical portion 19 is serrated as shown in FIGS. 6 and 7. When fully deformed, the serrated portions of conical portion 19 close together as illustrated in FIGS. 8 and 9.

While presently preferred embodiments of the invention are given for the purpose of disclosure, modification or variation in details of construction and arrangement of parts may be made which will readily suggest themselves to those skilled in the art and which are encompassed within the spirit of the invention and the scope of the appended claims.

We claim:

1. A non-extrusion sealing device for preventing extrusion of an annular elastomer seal element used to form a seal between the outer circumferential surface of a well casing and the inner circumferential surface of a casing head, wherein
    said elastomer seal element has a central opening along a central axis therethrough;
    said elastomer seal element has a plurality of circumferentially spaced through holes surrounding said central opening;
    said sealing device comprises a generally flat annular ring having a center opening and a plurality of open-ended truncated cone portions defining a plurality of through holes in said seal device which corresponds to the through holes in said elastomer seal element;
    each said truncated cone portion is serrated having radially spaced segments and gaps therebetween when said sealing device is in a nonenergized state;
    said sealing device having inside and outside diameters approximately equivalent to inside and outside diameters of said elastomer seal element;
    said sealing device is adapted to be positioned against radial end surfaces of said elastomer seal element such that a pair of said sealing devices are positioned on each radial end surface, respectively, to form an annular sealing assembly therewith, such that said plurality of holes of each said sealing device and said truncated cone portions are aligned to receive a bolt or pin member therethrough and to form a seal therewith upon deformation of said elastomer element and each said truncated cone portion in response to compression of said sealing assembly;
    said annular sealing assembly is positioned in an annular gap between said well casing and said casing head, such,that upon energization said sealing assembly is compressed along a direction parallel to said central axis causing said elastomer seal element to deform and to be guided radially by said sealing devices in radially inward and outward directions such that the truncated cone portion of each sealing device is flexed into a position wherein said cone portion is generally co-planar with the remainder of said generally flat annular ring and said annular sealing assembly contacts said well casing and said casing head forming a seal therebetween.

2. A sealing device according to claim 1, wherein
    said sealing device further comprises a side wall extending from the outer circumferential edge of said sealing device in a direction parallel to said central axis;
    said side wall being adapted to flex in a radially outward direction to engage the inner circumferential surface of said casing head when said sealing assembly is compressed causing said elastomer seal element to deform along a radial direction.

3. A sealing device according to claim 1, wherein said annular sealing assembly is adapted to be positioned between a slip bowl and a junk ring forming therewith a slip-type casing hanger support assembly for supporting said well casing within said casing head.

4. A sealing device according to claim 2, wherein said annular sealing assembly is adapted to be positioned between a slip bowl and a junk ring forming therewith a slip-type casing hanger support assembly for supporting said well casing within said casing head.

5. A sealing device according to claim 1, wherein said elastomer seal element has at least one radial split such that it may be positioned around said well casing.

6. A sealing device according to claim 2, wherein said elastomer seal element has at least one radial split such that it may be positioned around said well casing.

7. A sealing device according to claim 5, wherein said sealing device has at least two radial splits forming separate portions, wherein one end of a portion of each radial split is extended to partially overlap with the other end so that the portions may be joined to form one annular sealing device.

8. A sealing device according to claim 6, wherein said sealing device has at least two radial splits forming separate portions, wherein one end of a portion of each radial split is extended to partially overlap with the other end so that the portions may be joined to form one annular sealing device.

* * * * *